Aug. 17, 1965  P. R. HAAS DIT ROLLE  3,201,583
SAFETY PROCESS AND APPARATUS FOR RAILWAY SERVICES
Filed Feb. 16, 1959  5 Sheets-Sheet 1

INVENTOR
P. R. Haas dit Rolle
By *[signature]*
ATTORNEYS

Aug. 17, 1965   P. R. HAAS DIT ROLLE   3,201,583
SAFETY PROCESS AND APPARATUS FOR RAILWAY SERVICES
Filed Feb. 16, 1959   5 Sheets-Sheet 4

Aug. 17, 1965        P. R. HAAS DIT ROLLE         3,201,583
         SAFETY PROCESS AND APPARATUS FOR RAILWAY SERVICES
Filed Feb. 16, 1959                              5 Sheets-Sheet 5

3,201,583
SAFETY PROCESS AND APPARATUS FOR
RAILWAY SERVICES
Pierre René Haas dit Rolle, 13 Avenue de la Republique,
Paris, France
Filed Feb. 16, 1959, Ser. No. 793,462
Claims priority, application France, Feb. 18, 1958,
758,467, Patent 78,801; May 6, 1958, 764,878, Patent
82,752; Dec. 23, 1958, 782,474, Patent 1,381,202
13 Claims. (Cl. 246—30)

This invention relates to a safety automatic train control system for stopping immediately a vehicle on a railway track in case of any transgression of the safety regulations (as signal prescriptions, speed limitation of the engine . . . ) on any part of the track.

The invention enables an absolute and permanent control of the running of the vehicle by receiving and interpreting, in particular as a function of the speed, and the recording of all track information, and acts immediately on the braking mechanism in case of non-observance of the above mentioned information which may be transmitted in a continuous manner or at certain points. Any damage or breakdown of any element acts so that the equipment fails safe.

It is also necessary that the fixed and mobile equipments should not be unnecessarily complex and that only arrangements ensuring certain operation be utilised, with robust components that can be applied to all types of traction.

The present invention enables the requirements which have just been listed to be satisfied. It is in particular characterised by the fact that the information is transmitted from the track installations to the railway vehicles preferably by means of radio carrier frequencies which may be different according to the route or according to the class of instruction to be transmitted. The said carrier frequencies are themselves modulated by different frequencies which indicate the type of the instruction in a given class.

However, this preference in favour of radio frequency carriers does not exclude the use of audio frequencies.

By "class of instruction," should be understood the kind of information that is to say (1) signalling for ensuring that the spacing of the trains along a track is respected, or for prohibiting the passing of a point such as a junction, or in order to warn that it is only permitted to pass at a limited speed; (2) signalling a part of a line on which a speed restriction exists, either permanently (curves), or temporarily (due to work on the line). In the first class, the indications may be modified during the travel of the railway vehicle on the part of the line in question and it may be advantageous to be able to inform the equipment on board of such modification, in order not to delay unnecessarily a possible restoration of speed. In the second class of instruction the indications cannot be modified during the travel of the vehicle over the section of the line in question and it is sufficient that the indication be given to it at only a single point. By "type of the instruction" should be understood the rate of slowing down which must be observed, or the requirement to stop, as is necessary.

It should also be noted that in most countries the distance of signals relative to the points which they must protect is not constant and varies with the characteristics of the line, e.g. with an up or down gradient or with the permitted speed limit. Moreover, this permitted speed limit is not the same for all trains on the same section of line.

It is important to ensure that the equipment on board the railway vehicle takes account of all these considerations in order to achieve safe conditions.

According to another advantageous characteristic of the invention the carrier frequencies may be transmitted as pulses which enables the different classes of orders to be transmitted over a single channel, which may be constituted by the running rails, for example, which are connected to the beacons by means of a simple frequency selector.

It is possible to feed radio frequencies on a single conductor and therefore tracks having metal cross ties or sleepers, or any other kind of sleepers can be used.

According to another feature, the equipment on the vehicle comprises, in addition to a pick-up passing in the vicinity of the beacons, another pick-up which may collect information which is directly transmitted by the running rails or by any other feeder disposed along the track. From this results the possibility of continuous reception of instructions.

According to another feature of the invention, the servo-mechanism for effecting the automatic stopping of the train is maintained in the position permitting running of the train by means of a current generated by a generator slaved to the rotation of the running gear of the train which also serves as a device giving information on the speed. The generator is advantageously constituted by a simple magnetic track carrying a recording effected beforehand of a given frequency. The frequency of the current generated by the track passing in front of a reading head is precisely proportional to the speed of the magnetic track which is itself determined by the rate of rotation of the running gear of the vehicle.

According to another characteristic, the equipment on board the railway vehicle comprises an assembly of relays slaved to the carrier currents originating from the track installations. This assembly records the instructions received and carries them out. The arrangement in series of the relays concerning a given type of information of the various classes, results in giving priority to the most restrictive order of those indicated by the different track currents, and as a consequence it results that this order may only be cancelled by an information of the same class, that is to say supplied by a modulation of the same carrier frequency.

According to another feature the track currents act either indirectly or directly on a device, preferably a magnetic-mechanical device, which ensures a counting of the distance travelled by the vehicle from the point of origin of certain information, in order to cause the delayed release (that is to say after passing a predetermined distance) of the relays which only permit smaller and smaller speeds. This is done in order to ensure a correct slowing down curve, within the limits of safety, but enabling the driver to take any initiative and only intervening if the latter effects a wrong operation.

The magnetic-mechanical device may be replaced by an equivalent assembly having no current contacts, comprising magnetic tracks, recording heads, reading heads and erasing heads.

According to another feature, annulment contacts enable a return to upper speeds as from the moment of receiving the corresponding information without any need for the re-establishment of the contact to be made by the counting device, which in this case would require that a distance equal to that for the slowing down be again travelled.

According to yet another feature, the assignment of given carrier currents which are different according to certain tracks enables, by means of switching of the input circuits of the equipment, the prevention of the forwarding of traffic on a track not provided for, without informing the driver.

According to a further feature a suitable variable switching, which will be described later enables on the one hand to limit the speed of a railway vehicle to a given rate, on the other hand to cause an automatic interpretation of the track information to be effected as a function of the type of traffic which the vehicle is handling.

The equipment may also include a device having electrical or magnetic-electrical contacts and inertia relay which ensure the control and the effective operation of the mechanical transmission determining the movement of the elements driven by the running gear. This device fails safe in case of any breakdown. The process of interception by a beacon disclosed in the present application represents an improvement to the system described in my copending application Serial No. 658,672 filed May 13, 1957.

In the system of my former application a screen is effective in interrupting the coupling between the oscillator and the amplifier on the railway vehicle.

In the present application the screen is effective in stopping the generation of oscillations of the oscillator on the vehicle. Thus the coupling between oscillator and amplifier may be made very close and unaffected by any external circumstances and capable of creating an amplifier current of high intensity.

The invention will be better understood from the following embodiments, given by way of non-limiting examples, and described with reference to the accompanying drawings in which:

FIGURE 1 shows schematically, a method of interception between a beacon and a railway vehicle which may be employed according to the invention as well as a means for prolonging its effect.

FIGURES 2 and 3 give two specific embodiments of this interception: the first using the passage of the elements on the vehicle normally coupled above the track equipment; the other operating by interposing the track element between coupled elements on the vehicle.

(1) The operation of a slow speed locking device when a section already occupied is being entered; that is to say when a train is allowed to enter at slow speed into a section in which there is already another train.

(2) An embodiment of the control for slowing down or stopping at different distances, according to information given by the track.

(3) The splitting into two of the relays and modifications to their supply.

Figure 10:
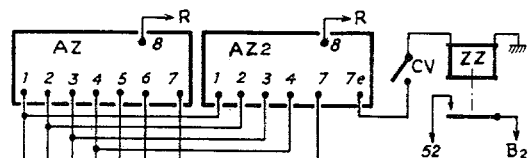

FIGURE 10 comprises the equipment for prescribing rates of slowing down which differ according to the type of traffic.

Figure 11:
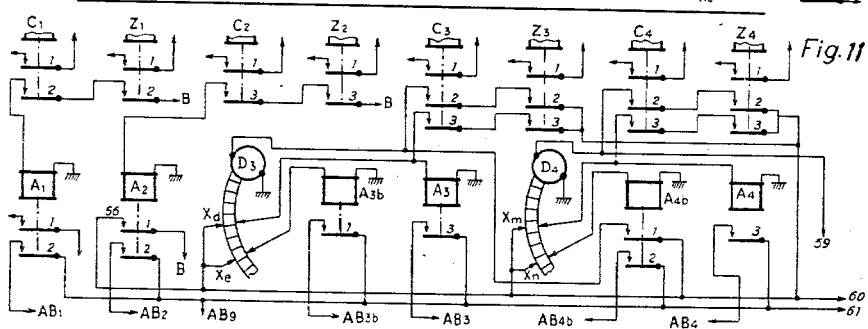

FIGURE 11 indicates an arrangement of supplementary speed control levels, the number of which is, as will be seen, independent of that of the rate of slowing down prescribed by the track.

Figure 12:
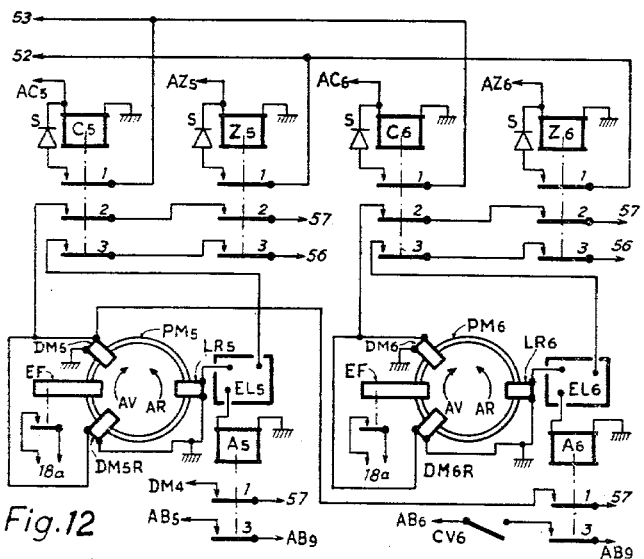

FIGURE 12 is a schematic view of a magnetic counting device. This schematic view comprises also one of the switching points, on the vehicle, enabling the maximum speed to be limited.

Figure 13:
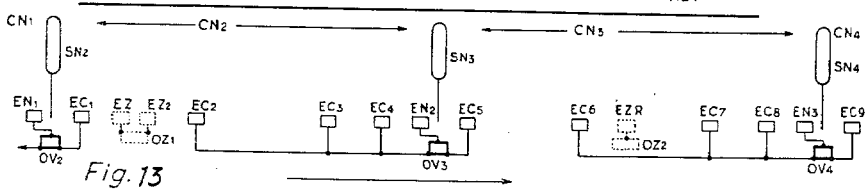

FIGURE 13 shows a method of positioning beacons, given by way of example, for the description of the operation according to the partial schematic views of the preceding figures.

Figure 14:
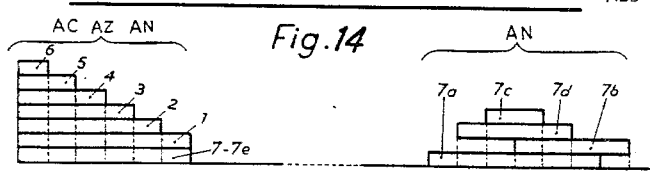

FIGURE 14 shows a diagram of possible distribution of the track frequencies.

Figure 15:
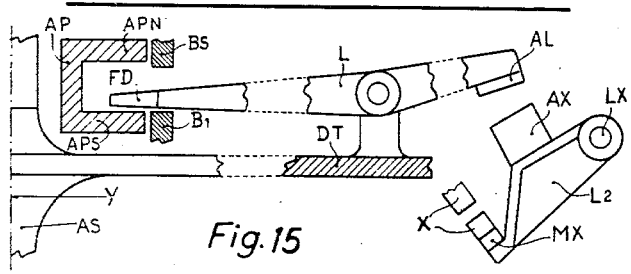

FIGURE 15 is a schematic view of a magnetic quick make and break device applied to a counting sector.

Figure 1:
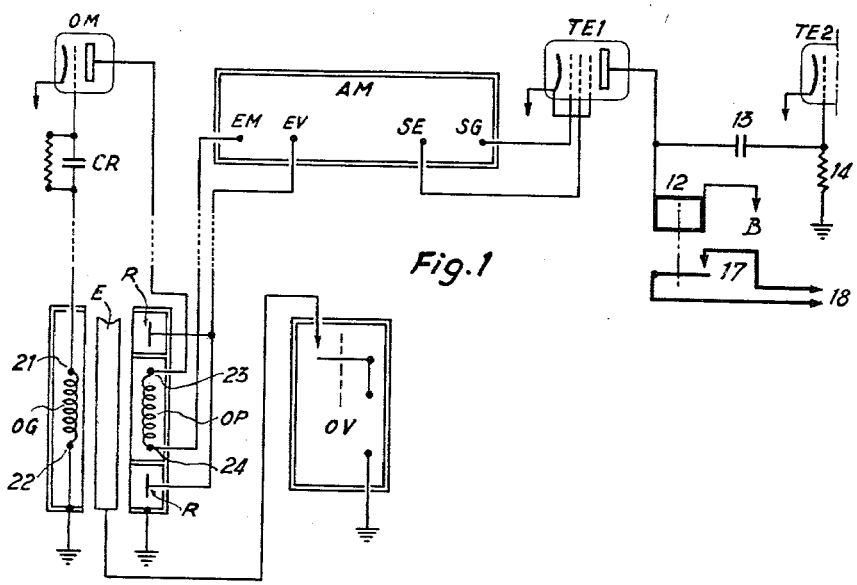
Figure 2:
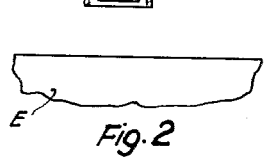

Referring to FIGURE 1, E is a beacon connected to a track transmitter OV when the corresponding signal is open. On board the railway vehicle, modulated oscillations generated by the assembly OM, CR, OG and OP are transmitted to the amplifier AM by means of an input terminal EM, when the beacon E is not interposed between OG and OP. The amplifier AM receives the modulated oscillations and feeds the control grid of the electronic tube TE1, from the terminal SG and the screen-grid from the terminal SE.

The amplifier AM is of conventional construction. The input EM is connected to a circuit which is tuned to the frequency of the oscillator OM in order to enable the amplification of the output from the latter. The input EV is connected to a circuit tuned to the frequency of the oscillator OV in order to enable the amplification of the current received by the pick-ups R. The outputs SG and SE are taken from points in the amplifier chain in order to apply suitable amplified voltages, resulting from the amplification of the currents originating either from the oscillator OM or from the oscillator OV, respectively to the control grid and screen grid of the tube TE1. The inputs EM and EV are connected to a conventional mixer stage, which together with the subsequent stages of amplification and detection do not posses in themselves any special features.

12 is an electro-magnetic relay inserted in the anode circuit of the electronic tube, TE1, it connects the latter to the source of direct current B and constitutes its load impedance. The capacitor 13 connects the anode of the tube TE1 to the grid of the tube TE2 having a grid leak resistance 14. The pilot releasing relay, which is not shown on the figure, is connected, directly or indirectly, to the output of tube TE2. The relay 12 may control directly, by the opening of contact 17, the operation of a servo-mechanism connected to the line 18. This arrangement constitutes a safety measure in case of damage to the load circuit of the assembly RC yet to be described.

Figure 4:
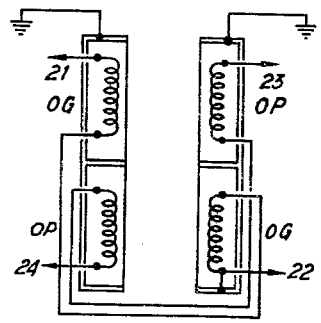
FIGURE 4 shows by way of example an arrangement which may be applied to coupling windings, in order to maintain constant the influence of a beacon on the grid winding whatever the amplitude of the rocking motion or other behaviour of the vehicle.
Figure 3:
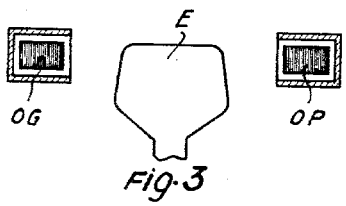

The pick-ups R (in two sections in the drawing) collect the radiation from E, fed by transmitter OV when the signal is open. The current collected by R is transmitted to the amplifier AM by means of the terminal EV. 21, 22, 23 and 24 are reference points for identifying the connections with the example shown in FIGURE 4.

The operation of the device is as follows:

The amplifier AM receiving the modulated oscillations by means of its terminal EM ensures the correct feeding of the tube TE1, through SG for the control grid and through SE for the screen-grid. This being so, the modulated current applied to the control grid is transmitted after amplification to the grid of TE2 which either directly or after a further amplification, supplies the useful signal for maintaining the servo-mechanism in a position of normal functioning.

On passing an open or clear signal, the beacon E screens the winding OG from OP and stops the generation of oscillations on board the engine, but the oscillations from the track transmitter OV are transmitted to the amplifier AM by the radiation of E, picked up by the pick-ups R, which enables the amplifier AM to continue to feed the tube TE1 and consequently the servo-mechanism from the reception of the modulated oscillations.

On passing a closed signal i.e. one set at danger, the stopping of the oscillations on board the vehicle by the beacon E is not compensated by the oscillations from the track transmitter OV. Therefore, the control grid and the screen-grid of TE1 are not feed, which causes the interrpution of the feeding of the servo-mechanism and causes the desired safety means to become operative.

The prolonging of the time of interruption of feeding the servo-mechanism which is intended to increase the safety factor of the system, is achieved as follows: As soon as the interruption of feeding of the screen-grid of TE1 occurs, the internal resistance of TE1 increases considerably, resulting in an increase in the charge on the coupling capacitor 13 owing to the increase of potential originating from B. This situation remains the same for the duration of the interruption caused by the presence of the beacon E. When the beacon clears the coupling elements, the tube TE1 is again immediately fed with oscillations via EM but owing to the decrease of the internal resistance of TE1, the potential across the coupling condenser 13 decreases and it discharges on the one hand through the anode-cathode space of the tube TE1, and on the other hand through the resistance 14 of the tube TE2, thereby applying to the grid of the latter a negative potential which is maintained until the new load equilibrium is re-established. This potential acts as a bias which is greater than that of the point of cut-off for the grid and the tube remains cut-off during the time of discharge, until there is a new equilibrium.

It is obvious that the prolongation of the time that the tube TE2 is cut off is a function of the value of the coupling capacitor 13 and of the leakage resistance 14. In order to benefit under all circumstances from this unchangeable and predetermined prolongation time, which is added to the period of interruption cauesd by passing the beacon, it is sufficient that the value of the load resistance (the coil of the electro-magnetic relay 12, in the example shown) be sufficiently small in order to enable a suitable charging of the condenser at the highest speeds of travel and for the smallest beacon lengths.

During the interruption of the feed to the screen grid of TE1, the relay 12 is obviously no longer energised and its contact 17 must normally open but this interruption of excitation may be too brief and the presence of the said relay has another function which is to release the stopping servo-mechanism in the case of any accidental increase of the resistance of the anode circuit which may increase the charging time of the capacitor, which thus involves the risk of a failure to detect a beacon. In effect, in the case of an increase of resistance which has just been envisaged, the excitation of the relay would be insufficient and the opening of its contact 17 would interrupt the line 18. However, if the device which prolongs the information has its full effect with very short beacons, it may be assumed that, provided a suitable and practical length is given to the beacons, the mere duration of the interception effect is sufficient and, for the whole of the process of control which will be described, no recourse to prolongation means is made. It is to be understood that electronic tubes shown in FIGURE 1 may be replaced by such devices as semiconductors.

With the aid of FIGURES 5 to 15, the complementary elements of the equipment on board the vehicle, enabling a reception, memorizing and interpretation of track information, will be described.

Figure 5:
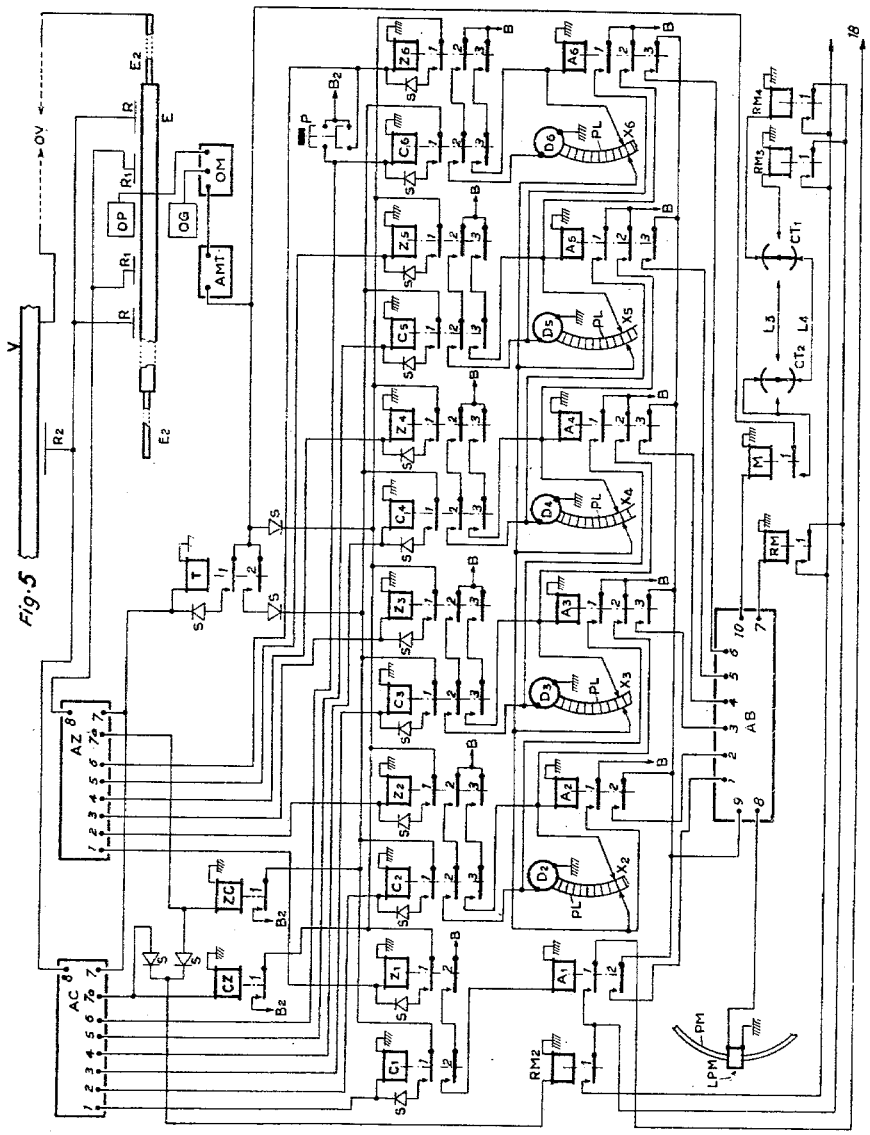
FIGURE 5 is a general schematic view of an equipment on a vehicle receiving the track information.
Figure 5A:
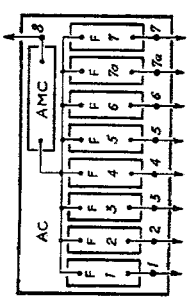
FIGURE 5a shows details of the amplifier A.C.

In FIGURE 5: E denotes one of the screening beacons of the track installation, extended on either side by the feeders E2. OM is the oscillator on the vehicle, OG and OP the coupling elements of OM enabling the oscillations to be sustained. They have been described with reference to FIGURE 1 and are shown in FIGURE 5, in the form of blocks. AMT is a conventional amplifier whose stages of amplification and of detection do not comprise any special feature. The function of the amplifier AMT is to feed different relays with the amplified current which result from the coupling between the oscillator OM and itself. OV indicates the connections to the installations transmitting track currents. R and R1 are the beacon information pick-ups, connected respectively to the amplifiers AC and AZ having modulated current filter circuits. R2 is the pick-up feeding AC with the information collected directly from the running rails (or another feeder) a fragment of which is shown at V. The amplifiers AC, AZ, AN and AZ2 (FIGURES 5, 9 and 10) include filter circuits and do not possess any original features. Their general structure is identical and FIGURE 5a shows their principle of construction, taking the amplifier AC as an example. The terminal 8 is connected to the input of the section AMC which is the amplifier detector proper, whose input is tuned to a given carrier frequency (characteristic for each amplifier). As a result, each complete amplifier (AC, AZ, AN, AZ2) only receives track information transmitted on the corresponding frequency and which are exclusively intended for it and transmitted by the pick-up connected to the terminal 8.

The output of the section AMC is connected to different selector filter circuits F1 to F6, F7a and F7, whose outputs are themselves connected to the terminals 1 to 6, 7a and 7 of the complete amplifier AC.

In the example shown, the filter circuits F6 to F1 pass increasingly wider frequency bands. That is to say if the filter F6 passes the frequencies comprised between 50 and 500 c./s., the filter F5 passes for example frequencies comprised between 50 and 1000 c./s., the filter F3 passes frequencies between 50 and 2000 c./s., etc. From this arrangement it results that in order to obtain on the vehicle the reception of track information classified by "classes" (spacing of trains, work on track, etc.), it is sufficient to assign to each of these a given radio carrier frequency corresponding to the tuned frequency of the input circuit of an amplifier on the vehicle, in order that the information in question be received by this amplifier and by it only. The "type" of the instruction (it is also recalled that this is the rate of slowing down or the stopping of the train) is determined by the value of the lower frequency modulating the radio carrier and which is forwarded by means of one or several of the filter circuits with the resulting influence on the control of the running of the train, as will be described. Each of the filters F6 to F1, could just as well only pass one given frequency exclusive to it, without modifying the principle of operation which has just been stated. The filters F7a and F7 each pass a frequency whose value is very clearly different from the frequency band admitted between the F6 and F1. C1 to C6 and Z1 to Z6 are series of relays respectively fed by the outputs 1 to 6 of the amplifiers AC and AZ; and by means of their different contacts, they control the relays A1 to A6, as well as the electromagnets D2 to D6, which act on series of contacts PL driven slowly in rotation by the movement of the running gear of the railway vehicle. Thus, each series passes respectively before the contacts X2 to X6. According to whether an electromagnet of the series D is energised or not, the contact stud passing in front of it will or will not make the contact of the series X when it passes in front of the corresponding point. For a detailed description of the operation of this part of the device reference will be made to FIGURES 6 to 8.

Figure 6:
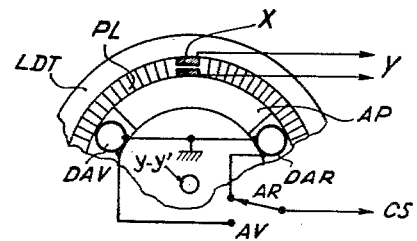
FIGURE 6 is a schematic view of a method of counting having delayed contact breaking.

FIGURE 6 is a schematic plan view, in greater detail, of one of the sectors of FIGURE 5, comprising the elements D-PL-X. The electromagnet has been divided into two, DAV and DAR, on either side of the contacts X. Each of these two electromagnets acts for one direction or the other direction of movement of the vehicle. The connection CS is that which in FIGURE 5 goes on the one hand to contact 1 of a relay A and on the other hand to contact 2 of a relay C. An optional automatic two-way switch effects the above mentioned connection to DAV or DAR, through AV or AR, according to the direction of the running. These two electromagnets may however be excited simultaneously without any disadvantage, in which case the switch AV-AR is not necessary. The line Y constitutes the connections ending at one of the points X2 to X6 of FIGURE 5, and shown simply as X on FIG- URE 6. AP is a permanent magnet between the poles of which pass the stud holders whose end is of soft iron. The electromagnet DAV, the permanent magnet AP, the electromagnet DAR and the contact X are fixed. The studs PL are driven in slow rotation by a circular plate rotating about an axis y–y' and pass in succession in front of the aforementioned fixed elements.

Figure 7:
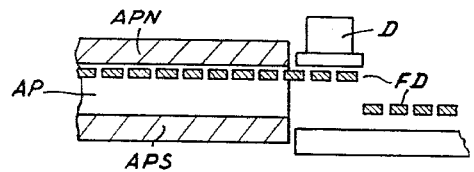
FIGURES 7 and 8 are fragmentary views in section of a counting sector enabling the operation of the latter to be better understood.
Figure 8:
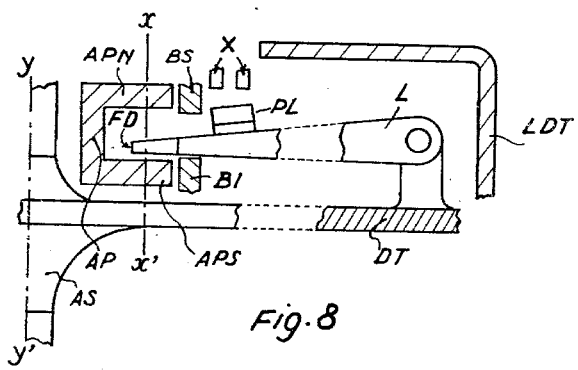

FIGURE 7 is a schematic section through the poles of the arcuate magnet AP of FIGURE 6, along the axis x–x' of FIGURE 8. For the purpose of representation, this circular portion has been developed in a linear manner. APN and APS are the north and south poles of the permanent magnet AP of FIGURE 6, between which pass the ends FD of the stud holders. D is one of the electromagnets located on either side of the permanent magnet AP.

FIGURE 8 is a schematic elevational section through the vertical plan of the contacts X, which can also be seen on FIGURE 6. The portions APN, APS and FD of FIGURE 7 can be seen on FIGURE 8 and have the same references. PL is the stud establishing the electrical contact between the two points X when the articulated assembly is in the upper position, according to the operation which will be described. BS-BI are bearings on which the stud holders slide with an easy fit. L is the jointed lever carrying PL and the soft iron end FD of which passes between the poles APN and APS of AP as well as under the electromagnets DAV and DAR one of which, it is recalled, is shown at D in FIGURE 7. The stud holder lever L is driven in slow rotation by DT integral with the shaft AS which rotates about the axis y–y'. The cap LDT, which can be seen on FIGURES 6 and 8 covers over the pivoting points of the stud holder levers.

The operation is as follows: In its rotational movement produced by its connection to the running gear of the vehicle, DT drives by means of the shaft AS the levers L in a movement of revolution in the course of which the soft iron ends FD will come in succession under an electromagnet D, between the poles APN/APS of the permanent magnet and under another electromagnet D (FIGURES 6, 7 and 8). When an end FD is under an electromagnet D, if the latter is energised it attracts FD which has an upper position. In the course of its movement, FD, after passing under D, comes under the pole APN of the permanent magnet and the attraction of this pole is exerted after that of D without there having been an interruption of the attraction exerted on FD. This being so, the stud PL will establish the contact between the points X. If on the contrary, when FD comes under D, the latter is not energised, the end FD of the lever L, normally drawn towards the lower position by the suitable known means will retain, in passing under D, the said position. This being so the attraction of the pole APS of the permanent magnet will be exerted on FD and in passing in front of the points X the stud PL will not establish the contact, as is shown in FIGURE 8. (From this figure it is easy to imagine the reverse position which establishes the contact X–PL.) The ratio between the surfaces of the contacts X and of the studs PL, as well as the spacing between each of the latter, are such that when they are in the high position the passing of the studs under the points X constitutes a permanent electrical contact between the latter, said contact being interrupted by the first stud passing in the low position.

After this description reference should once again be made to FIGURE 5. 18 is the line which when interrupted, releases the stopping servo-mechanism. P is a push button provided for putting the equipment into operation, when the vehicle has been at rest, and all the supplies have been cut. It enables the direct supply of the relays T, C1 to C6 and Z1 to Z6, from a source B2 on the vehicle which is practically the same as B. In the drawing, only the connections for C6 and Z6 have been shown in relation to the push button P. However they are all strictly analogous for the different relays which then remain supplied by AMT under the influence of OM, by means of their hold-on contact 1. The push button P is placed in such a manner that when the vehicle is running, it is out of reach of the driver and, preferably in a locked enclosure. S designates unidirectional elements intended to avoid any interference current or return current in the various circuits. B represents a source of current on the vehicle. The earth return connections of the amplifiers are not shown.

Figure 5B:
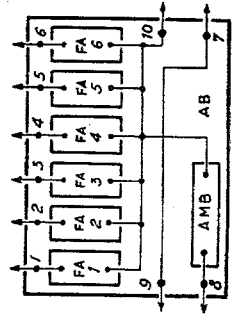
FIGURE 5b shows details of the amplifier AB.

PM is a magnetic track, which carries the recording of a given frequency which is effected beforehand and is driven in rotation by the running gear. It results that as the magnetic track passes in front of the reading head LPM, it produces in the latter a current whose frequency is strictly proportional to the speed of travel of the train. The reading head LPM is connected to the input 8 of an amplifier AB whose components, which are conventional, are shown in FIGURE 5B. AMB is the amplifier element proper. Through the output 10, it enables the relay M to be fed whatever the frequency produced by the reading head LPM, from the starting of the train up to the highest speeds. FA1 to FA6 are filter circuits inserted between the output of the amplifier element AMB and, respectively, the outputs 1 to 6 of the complete amplifier AB. These outputs are themselves respectively connected to the fixed contacts 2 of the relays A1 and A2 and to the fixed contacts 3 of the relays A3 to A6. The movable contacts corresponding to said fixed contacts of the said relays A1 to A6, are joined and constitute a return line connected to the terminal 9 of AB, which is connected to the terminal 7 which is connected to the relay RM. The filters FA1 to FA6 pass frequency bands which are increasingly wider. That is to say that the filter FA1 only passes the frequencies produced in the reading head LPM, from starting up to "cautious running," which is a very low speed; the frequencies produced when the speed is higher being stopped by said filter. The filter FA2 permits the passing of frequencies produced as from starting up to a speed which is slightly higher than that permitted by FA1. FA3 permits a higher speed than FA2 and so on. FA6 does not in fact involve any restriction, it permits the passing of all the frequencies produced in the reading head LPM, from starting up to the highest speeds.

The insertion of filter circuits and of movable contacts controlling them between the amplifier element AMB and the relay RM which it must feed has the purpose of permitting the control of this feeding as a function of speed and of the track information or of the permanent restrictions on the train. The opening of the contact of the relay RM releases, when the vehicle is running, the stopping servo-mechanism as will be described later.

FIGURES 5a and 5b show the internal principle of construction of the amplifiers having filter circuits. In order to simplify the description of the operation, the whole arrangement of a filter circuit and of its output terminal will now be referred to as a "channel." For example the filter circuit F3 of the amplifier AC (FIGURE 5a) will be called "channel 3 of AC"; the filter circuit FA6 of the amplifier AB (FIGURE 5b) will be called "channel 6 of AB."

The first function of the rotary commutator segments CT1 and CT2 and the slow-close relays RM3 and RM4 is to prevent the release of the automatic stopping servo-mechanism when the vehicle is not in motion. When the vehicle is stationary, no current is produced in the reading head LPM; the relay RM is not fed and the open position of its movable contact 1 would cause the interruption of the line 18 which can adavntageously control a servo-mechanism such as the one shown in patent application Ser. No. 658,672. This is remedied by the following means. CT1 is a rotary commutator segment carried by the axle on which is effected the power take-off for driving the mangetic track PM and the stud sectors PL (this power take-off is constituted by known means as are used for driving registering chronotachometers). CT2 is another rotary commutator segment but which is mounted on the mechanical transmission, at the terminal part opposite to the axle, in such a manner that any mechanical damage which may immobilise the counting sectors also immobilises CT2. This device fulfills a second function which constitutes a safety measure and which will be apparent from the description of the operation. The first function stated above will be described first. By means of the complementary disposition of their contacts and the synchronism of their movement, the commutators CT1 and CT2 join the fixed contact of the relay M, either to the relay RM3 by means of line L3, or to the relay RM4, by means of line L4, without there being any break in continuity whatever the position of the commutators which remain synchronised as long as the mechanical transmission functions normally. From this it results that one or the other of relays RM3 and RM4 is fed by the amplifier AMT, to which they are connected by CT1, the line L3 or the line L4, CT2 and the contact of the relay M when the latter is not energised which is the case when the vehicle is stationary since the reading head LPM does not supply any current. The excitation of RM3 or RM4 ensures the continuity of the line 18 by their respective contacts 1 which are in parallel and which neutralise the open position of the contact of the relay RM.

As soon as the vehicle is in motion, the reading head LPM supplies a current and RM fed by the amplifier AB is energised so that its contact ensures the continuity of the line 18. The relay M which is also fed by AB is also energised and its movable contact interrupts the connection of the amplifier AMT with relays RM3 and RM4. These two latter relays are no longer energized and their contacts no longer ensure the continuity of the line 18.

The second function fulfilled by the assembly CT1, CT2, RM3, RM4, which is a safety function, will now be described. It has been stated that the relays RM3 and RM4 are slow closing. This characteristic is absolutely necessary in order to carry out this second function. Indeed, since it is obvious that the driving of the magnetic track PM must be effected in such a manner that said track can only be in motion if the sectors PL are themselves in motion, which is elementary, the immobilisation of the track PM would be insufficient for safety, because in the case of such an accidental immobilisation or merely in the case of a breakdown affecting AB, the deenergisation of RM would actually interrupt the line 18, but the deenergisation of M would reestablish the excitation of RM3 and RM4. It is known that RM3 and RM4 are fed by AMT without being dependent on the track currents. From this would therefore result a continuity of the line 18 precluding any check because in practice it is not possible to be sufficiently sure that in all circumstances the contact of RM would fall clearly before that of M, in order to release the stopping servo-mechanism. But, solely due to the fact that the relays RM3 and RM4 have a great inertia on closing, even in the case of good synchronisation maintained between CT1 and CT2, the feeding of the said relays would be interrupted alternately for one and for the other and, owing to their inertia, their movable contacts 1 would remain open and would not prevent the release of the stopping servo-mechanism. All the more so, if owing to mechanical damge, the synchronism of CT1 and CT2 was disrupted. The only purpose of the relay M is to cancel the feeding of the relays RM3 and RM4 when the vehicle is running, which avoids with complete certainty a possible "beating" of said relays on passing from a critical state of intermittent feeding, which could be detrimental to their life, in the case of the use of electromagnetic relays as is indicated in the example shown on FIGURE 5. The preceding description mentions two slow close relays (RM3 and RM4) and two lines (L3 and L4). It is obvious that one could use three relays or more, fed in the same manner, by other contacts of CT1 and CT2 and other lines similar to L3 and L4, which would in turn each control one movable contact in parallel to those of RM3 and RM4.

In order to have an exact idea of the device before describing in detail its operation, it should be noted that all the components have very small dimensions and may even be of the miniature kind. Weak currents pass through them and simultaneous excitation of a given number of relays amounts to a very small consumption only. The asesmbly does not take up a large volume and the possibility of low voltage supplies and very low current also facilitates its adaptation to all kinds of traction.

In order to reduce the likelihood of incorrect operation to a figure which is as near as possible to zero an absolute condition is that any defect of operation or damage can only result in the equipment failing safe. This necessary requirement makes it absolutely necessary to provide certain parts which have no other function other than that of satisfying this obligation in view of which one is lead to discard apparently simple means but which would require a complement of elements in order to give the same safety and which therefore render the assembly still more complex. This is the reason, which has led to the choice of the embodiment shown, althought modifications are indicated in order to stress the non-limiting character of the invention.

The operation of the equiment will now be described for the case when a vehicle is running on track sections in which the information is exclusively transmitted by beacons which feed the amplifiers AC or AZ when the vehicle is passing. The carrier frequency feeding AC supplies so-called section information (spacing of the trains) and information of slowing down or stopping at junctions whilst that feeding AZ supplies the slowing down information which cannot be modified (limitation owing to the lay-out of the line or work being effected on the track). As has been stated above, the control equipment is put into a stage of operation by manipulating the push button P. The contacts 2 and 3 of the relays C2 to C6 and Z2 to Z6, as well as the contacts 2 of C1 and Z1 ensure the connection to ensure the excitation of the relays A1 to A6 and of the electromagnets D2 to D6.

The part of the diagram which shows the relays C and Z mounted in series indicates that by means of the contacts 2 of C1 and Z1 and 2 and 3 of C2 to C6 and Z2 to Z6 it is strictly ensured that priority is given to the most restrictive information and to the need for unanimous cancellation of a restriction of running, a characterstic whose importance must be emphasised.

Although the relay T acts only as a transition element, when passing from a section of track having information given solely by beacons to a section having mixed information; i.e. from running rails or feeders as well as beacons, or for passing in a reverse direction; in order that the present part of the description may be clearly understood it should be mentioned that the relay T, once it is fed by AMT through its contact 1 ensures, by its contact 2 the connection of AMT to the relays of the series C.

On passing a track beacon, as is known, the interception by the beacon E of the coupling OG, OP, which are elements of the oscillator OM, causes said oscillator to cease oscillation. From this it results that the amplifier AMT, being no longer fed by OM does not supply any current. During the said interception, the relay T and those of the series C and Z are therefore henceforth fed only by any track currents which may be present and are transmitted by the beacon and collected by the pick-ups R or R1. On passing a beacon giving a "line clear" information (no restriction on running) and intended for the amplifier AC, the information is constituted by a carrier frequency corresponding to the tuning of the input 8 of the amplifier AC and of said input only. The input 8 of the amplifier AZ is tuned to another frequency in order that it may in turn, receive information which is exclusively intended for it. The carrier frequency intended for AC in the presently described case is modulated by means of two low frequencies. One feeds the relays C by the channels 1 to 6 whilst the other has a value which is such that it passes the channels 7 and 7a. It feeds the relay T, by the channel 7 and the relays CZ and RM2, by channel 7a. The information being "line clear," it is important that all the relays C and Z remain excited in order that their contacts continue to ensure the feed connection of the relays A1 to A6 and of the electromagnets D2 to D6 during the passing of a beacon. Indeed, the relays A1 to A6 and the stud-carriers PL controlled by the electromagnets D2 to D6 enable the safety relay RM to be connected to the channels 1 to 6 of the amplifier AB, for ensuring that it is fed by the current originating from LPM. During the presently described passing of a beacon, the relays C are in fact fed directly by the track transmission after amplification and rectification in the amplifier AC, but the relays Z cannot be fed by the amplifier AZ since the input 8 of the latter is tuned on a different frequency. The maintenance of the feed of the relays Z, during the passing of a beacon having an information for AC is thus obtained by the relay CZ which is excited by the track current supplied to it through the channel 7a of the amplifier AC, the consequence of which is to close its movable contact 1, which contact causes the relays Z to be fed by the source on board B2, thus substituted to AMT. The channel 7 causes the relay T to be fed, which remaining energised, will continue to permit, by means of its contact 2, the feeding of the relays C by AMT when the beacon has been passed. Lastly, the channel 7a also causes RM2 to be fed which being energized, attracts its contact, which ensures the continuity of the line 18. The relay RM2 is provided solely to enable a stopping of the vehicle on a beacon, without systematic release of the stopping servo-mechanism. Indeed, when the vehicle is stopped, the contact of relay RM is open and the continuity of the line 18 is ensured by RM3 or RM4 according to the position of CT1 and CT2 at the moment of stopping RM3 and RM4 being only fed by AMT and the latter receiving no current when the coupling of the elements OG and OP is intercepted by a beacon, the servo-mechanism would be released in the case of the vehicle stopping on a beacon, without the intervention of RM2. Once the beacon is passed, the relays C and Z and also the relay T are again fed by AMT. The relays CZ and RM2 having no further functions to fulfil, they are no longer energised and their contacts 1 are open.

The passing of a beacon whose information is intended for AZ gives rise to an operation which is the converse of the action which has just been described. That is to say a carrier frequency corresponding to the tuning of the input 8 of the amplifier AZ is transmitted and one of its two modulation frequencies passes through channels 1 to 6, and the other passes through channels 7 and 7a, of the amplifier AZ. T and RM2 are fed by means of the channel 7 of AZ and the relays of the series C (since AC does not receive the presently considered carrier), are fed by B2 by means of the movable contact 1 of ZC which is fed by means of the channel 7a of AZ as previously CZ was fed by the channel 7a of AC.

On passing a beacon whose signal acts as a distant signal giving the warning of stopping at the following signal, the carrier intended for the amplifier AC comprises two modulations, one passes the channels 7 and 7a for feeding T, CZ and RM2 as already described, the other has a value such that it can only pass the channel 1 (being stopped by the other channels). From this it results that only the relay C1 is energised, the relays C2 to C6 are not energised and their contacts are open and it will no longer be possible to feed these relays by means of AMT after the beacon has been passed since their hold on contact 1 is open. The opening of contacts of the relays C2 to C6 has the following consequences. The contact 3 of C6 no longer connects A6 to the source B, A6 is now connected to B only by the contact X6, but the contact 2 of C6 no longer connects the electromagnet D6 to the source B. This being so, as soon as the contacts of C6 open, the electromagnet D6 no longer attracts the studs which pass in front of it and, as from that moment, the studs which pass in front of the electromagnet remain in the position such that, in the course of their rotation in front of the two points forming the contact X6 they do not ensure its continuity as has been described in FIGURES 6 to 8. From this it results that when the last stud which, in passing in front of the electromagnet D6 has been put in a contact position for X6 reaches this latter point, the passing of the following studs no longer allows the contact X6. At that moment, A6 is no longer fed and its contacts open with the consequence that the contact 3 of A6 interrupts the connection of RM with the channel 6 of AB, which ensures the first point of the testing of slowing down. In effect, the channel 6 is the only channel which permits the passing of the frequency of the current produced in the head LPM when the vehicle travels approximately at its greatest speed. Thus, if at this point of control, the speed exceeds that which corresponds to the frequency which can pass the channel 5, the relay RM cannot be energised and its open contact 1 interrupts the line 18, since the channel 6 is no longer connected to it. It is found that between the point where the information has been given (interruption of the feed of D6 by opening the contact 3 of C6) and the point where the speed must be reduced to a rate corresponding to the frequency which can pass the channel 5, a distance is left which corresponds to that which is traveled by the vehicle in order to entail the passing of a stud PL between D6 and X6.

As from this control point, determined by the opening of the contacts of A6, the linking of the control is continued in the following manner: The interruption of the contact 1 of A6 interrupts the connection of D5 with the source B and D5 being no longer fed no longer acts on its corresponding studs. The contact 2 of A6 no longer enables the connection of the relay A5 with the source B, the relay A5 is henceforth only fed by the intermediary of the contact X5 which will itself be interrupted when the last stud which has been attracted by D5 (before the interruption of the supply to the latter) will be passed in front of X5. At this point, the relay A5 is therefore no longer energised and its contacts open. The relay RM is no longer connected either to the channel 6 or to the channel 5 of AB and, as from this control point, the speed must not exceed that which corresponds to the frequency which may pass the channel 4 of AB. The opening of the contacts of the relay A5 affects the relay A4 and the electromagnet D4 in a manner similar to that which has been described for A6, D6 and A5, D5. The same applies to A3, D3 and A2, D2. Only A1 remains energised being connected to the source B by the contact 2 of C1. It is known that the relay C1 has remained fed by the track current on passing the beacon and that since its hold-on contact 1 has not opened, it has been re-fed by AMT after said passing. This being so, after the relay A2 is deenergised only very slow running is permitted since only A1 is energised and it permits the feeding of RM only by the channel 1 of AB which, itself, only passes the frequencies produced if the vehicle runs very slowly. The instruction for absolute stopping or of permitting passing whilst maintaining the very slow speed, will be given according to the information supplied by the beacon of the signal which effectively protects the line section situated immediately beyond its own position. The instruction of absolute stopping is of course given by the absence of track current, since in this case C1 and Z1 are not energised and the opening of their contacts 2 interrupts the feeding of the relay A1 and the opening of the contact 1 of A1 interrupts the line 18.

For the slowing down information, the mechanism of release is the same as for the stopping, with the only difference that the track current makes it possible to maintain the energisation of the relay permitting the prescribed speed as well as, of course, the energisation of the relays permitting lower speeds.

The control of slowing down by successive steps of decreasing speed constitute a predetermined slowing down curve. It is possible to modify it, as will be stated later on. Six steps have only been chosen to serve for the description but it is obvious that any number smaller or greater may be chosen.

It may however, be considered that a total of eight steps enables a substantially continuous control for an extended range of speeds.

In all the cases of slowing down, which are prescribed permanently or temporarily, two beacons are sufficient: the one prescribing the instruction (at a suitable distance) and the other permitting the complete or partial resumption of speed. On the contrary, when the "section" information is given by beacons, it is advantageous, in view of the ease with which they are set up and of the fact that it is possible to feed them from the running rails as well as their low cost and that no maintenance is necessary for them to distribute several of these along a section which enables the cancellation of warning to be transmitted from point to point (or on the contrary, the control of absolute stopping).

With reference to the authorization of complete or partial resumption of speed, the transmission of the modulated frequency desired has as a consequence the feeding of the corresponding relay (C or Z). This resumption may be effected without delay because the contact 3 of the relay C or Z in question re-feeds directly the corresponding relay A, whilst the contact 2 re-feeds the electromagnet D, which repositions the studs PL for contact with X, in order to enable a possibly new carrying out of a slowing down order.

From this description of the operation, it is clear that the device gives every useful interpretation to the indication supplied by the signals, taking into account in particular the speed at which they are approached.

The following part of the present description relates to the operation of the device on those track sections which comprise transmission of information by beacons combined with a transmission of direct information from a feeder to the vehicle.

Immediately at the entrance to a section where the feeder influences the amplifier AC, by means of the pick-up R2, there is placed a beacon known as a "transition beacon." As in the case for those which are located in this section and which supply information for the amplifier AZ, the transition beacon may transmit all the modulated frequencies for the channels 1 to 6 and 7a (of the amplifiers AC or AZ according to the carrier) excluding the frequency which may pass by the channel 7.

This being so, when passing the transition beacon, the relays C and Z behave in a known manner, but the transition relay T whose feeding by AMT is discontinued is not fed by a track current and its contacts open. The opening of the contact 1 prevent its re-feeding by AMT after passing the beacon and the contacts retain the open position. The effect of interrupting the contact 2 is to discontinue the energisation of the relays C by the current from AMT. It results from this that the relays of the above mentioned series are only excited by the modulation of the carrier frequency directly transmitted from the feeder (or, of course, by the channel 7a of AZ and ZC, on the passing of beacons for information intended to AZ). The information transmitted from the feeder device acts on the relays C in the same condtions as passing a beacon, and it thus produces substantially the same effects, the only difference being that it is permanent. The modulations of the carrier frequency emanating from the feeder may, according to the particular case, feed the channels 1 to 6 of the amplifier AC, excluding the channels 7 and 7a. The relays T and RM2 are thus never fed by this source of information. On the sections in question, of these two latter relays only RM2 may be fed and, as already described, only during the passing of a beacon, in order to permit the vehicle to stop over one of them without interrupting the continuity of the line 18.

At the exit from sections having permanent information, imediately before this exit is situated another transition beacon, but this beacon, in contrast to the beacon at the entrance to the section, transmits the frequency for the channel 7, the effect of which is to energise the relay T and thus to close its contacts. After passing the beacon, AMT by means of the contact 1 will feed the relay T which will retain its contacts closed. By means of the contact 2, the action of AMT on the relays C will again become manifest and the situation existing before the entrance into the section having permanent information will be re-established.

In practice in order to enable reversing movements on a double track and its application to a single track, a point of transition comprises two beacons, one on each side of the point and each giving the suitable information for the track section to which it relates. The transition adaptation is indefinitely reversible and a vehicle can shuttle to and fro from a point of entrance or of exit from a section. The automatic reversibility is one of the characteristics of the system, with respect to what has been explained as well as with respect to the elements driven in rotation by the running gear. It is obvious that the symmetrical disposition of an electromagnet on either side of the permanent magnet and of the contact X permits a complete reversibility of operation of the device for counting the distance. It should be noted that the system not only permits one or several stops, but also running in reverse and, in that case, deducts the distance travelled in the other direction and causes the instruction to be carried out at the prescribed place only.

The commutator elements CT1 and CT2 also allow for reversibility. They have of course been shown schematically and the number of contacts per revolution is in fact normally different in order to permit a rate of interruption which is in agreement with the result which is desired.

With respect to the magnetic track it is just as obvious that since it carries the recording of a single frequency which is a simple sine curve its direction of travel in front of the reading head is immaterial.

It may also be stated that a single magnetic track constituted by a rigid circular magnetic tape, whose control is suitably reduced is sufficient to feed the amplifier AB, as from the commencement of movement up to the largest speeds, a frequency ratio of more than 400 (for example) is absolutely normal for an amplifier of audio frequencies which, moreover, may comprise an automatic gain control without in any way complicating its connections. However, it is possible to provide for example two magnetic tracks travelling at different speeds, one of which becoming effective from the starting of movement of the vehicle up to a few kilometers per hour; and the other from this limit up to the greatest speeds.

Moreover, it may be noted that the system enables, by using distance counting sectors for each direction (with the reversing switch AV–AR, FIGURE 6), the distance to be varied between the controlling electromagnet and the point of contact X for carrying out a controlling operation. Thus it is possible, with a lockable control, to displace the point X along the sector of the studs and to dispose a means of adaptation of running as a function of the type of running comprising also, a conventional servo-mechanism prohibiting any incorrect operation.

The possibilities of extending the automatic control with respect to instructions originating from the track will now be described together with the combination of use and connection of the elements on the vehicle.

Figure 9:
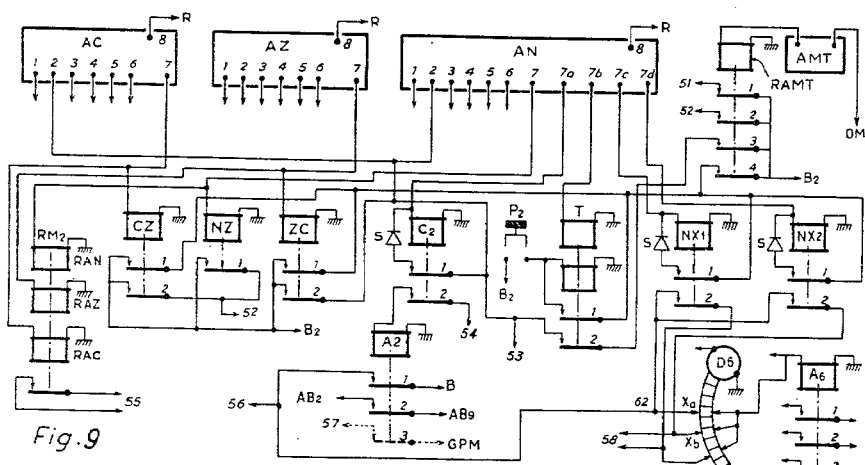
FIGURE 9 shows a part of the general schematic view; it illustrates.

In FIGURE 9, the inputs 8 of the amplifiers AC, AZ and AN are connected to the device R, picking up the track information (not shown). These inputs may be switched on the vehicle for tuning to different carriers in the case of special frequencies assigned to tracks or to the direction of traffic.

This switching enables a route to be followed to be predetermined my modifying the frequency of input tuning for each of the amplifiers if different carrier frequencies are assigned, in particular to the tracks 1, 1b, 2, etc. They may also be useful for the operation of the device on a single track or on a two-way working track.

The elements S, also on FIGURE 12, are single-direction conductors intended to prevent the passing of current in the reverse direction. It is possible to eliminate them by duplicating the relays as is indicated for T, of FIGURE 9. This arrangement may be generalised, and may for example be extended to the other relays fed, either by a track current, or by a source on the vehicle.

The amplifier AMT, which is influenced by the current of the generator OM (not shown), only feeds in this connection the relay RAMT; the latter by its different contacts, connects the source B2 to the relays fed previously by AMT directly. Thus the contact 1 and the line 51 cause RM3 and RM4 to be fed by the contact of the relay M and rotary commutators CT1, CT2 (FIGURE 5); the contact 2 and the line 52 connect B2 to the relays of the series Z (not shown) by their hold on contacts; the contact 3 causes the relays of the series C to be fed, by the contact 2 of T and their hold on contact 1 (line 53); the contact 4 connects B2 to the relays NX1, NX2 and to the lower winding of T, by their respective hold on contacts.

P2 is one of the manual contactor elements, which enables the running position to be set, which is absolutely necessary for certain relays, when the feeding sources have been interrupted, when at rest.

In the example shown, P2 acts on the lower winding of the relay T which is divided into two, which it causes to be fed by B2 and the upper winding of which can only be fed by the channel 7b of the amplifier AN. The line 54 connects the contact 3 of C2 to the corresponding contact 3 of Z2, according to the general schematic view (FIGURE 5) and as can be seen also on FIGURE 11.

Through 55 the contact of the triple relay RM2 (RAN–RAZ–RAC) is connected to the line 18. To the line 56 are connected all the points concerning the electromagnets D, the contacts X and the relays A which may be connected to the source B (except A1 and A2 which are connected to it respectively by the contacts 1 of C1–Z1 and 2 of C2–Z2). FIGURE 5 indicates all these points, some of which are shown in FIGURE 11.

The contact 3, of A2, connecting the point 57 to GPM and shown dotted, only exists in the case of use of magnetic tracks for the counting of distances, and will be described with the operation of FIGURE 12. A6 and D6 are connected in the manner already described and are the only elements of the series A and D and which can be seen on FIGURE 9, the connections of the others being similar. The amplifiers AC and AZ fulfill the functions already described. In the example shown on FIGURE 9, the channel 7 of these two amplifiers enables the passing of all the frequencies accepted by the channels 1 to 6. From this it results that the operation of these two amplifiers requires only one frequency at a time (beacons EC of FIGURE 13).

The same thing occurs for the amplifier AN for its channels 1 to 7. Its channels 1 to 6 (except 2) end directly at the corresponding relays C, as those of AC.

The method of connection specific to C2 determines that slow running is maintained in an engaged block section, according to the description which will follow.

The amplifier AN comprises, moreover, the channels 7a to 7d which pass modulated frequencies, in conditions which are exemplified in the diagram of FIGURE 14. The input 8 of this amplifier only permits the influence of those beacons whose information is exclusively intended for it and which are situated in the vicinity of the end of a block section (EN1, EN2, EN3 of FIGURE 13), which have two functions: (1) Controlling the locking in slow speed running and the unlocking. (2) Determining the distances imparted for the observance of the slowing down and stopping.

For the operation which will be described, reference will be made to FIGURES 9 and 13. In the example which is given on FIGURE 13, OV2 (in the vicinity of SN2) feeds EN1 and EC1, the beacons located in the section CN1 not being shown. OV3 (in the vicinity of SN3) feeds EC2, EC3, EC4, EN2, EC5. EC2, EC3 and EC4 transmit simultaneously the same information. The arrangement and the respective characteristics are the same for OV4, EC6, EC7, EC8, EN3, EC9. The beacons EZ, EZ2 and EZR, shown dotted, will only have to be taken into consideration for the description of the operation of the elements of FIGURE 10.

In the present example, traffic passing through the block sections CN1 to CN4 (in the direction of the arrow) passes in succession the signals SN2, SN3, SN4. If the section CN4 is occupied, the signal SN4 is at stop of the block section (that is to say that it will be possible for the vehicle to penetrate in the said occupied section whilst it is running very slowly) and the signal SN3 is at warning. Traffic may then reach freely SN3; that is to say that from EN1 to EC4 the beacons give the indication: line clear; but from EN2 to EC8: stop at the next signal.

It is known that on passing the beacons, AMT is no longer fed, which causes the opening of the contacts of the relay RAMT and the interruption of the feeding of the relays of the series C and Z. The same occurs for T and NX1, NX2 of FIGURE 9. But these relays may possibly be maintained by direct or indirect influence from the track currents.

The beacon EN2 (which is assumed to be reached by the traffic in question) transmits two modulated frequencies. The first is situated in the left part of FIGURE 14 and in the present case releases, by means already described, the instructions for reduction of speed up to the beacon EC6, enabling the stopping at SN4 (an identical information will be given by EC5 which will feed AC). This frequency enables moreover, by means of the channel 7, RAN to be fed (for maintenance of the line 18 in case of the vehicle stopping on a beacon) and NZ (the latter ensuring the maintenance of the relays Z).

The second modulated frequency of the carrier transmitted by EN2 is situated in the right hand part of FIGURE 14 and determines the distance imparted for obtaining the slowing down and the stopping at the suitable points in the section which will be travelled through. The relays NX1 and NX2, by their contact 2, have the function of establishing or interrupting the useful connection to the contacts Xb and Xc of the sectors D (D6 alone is shown, the connection to the other sectors is established by the line 58). According as to whether the transmitted frequency will be able to pass the channel 7b which feeds T alone or also to pass the channels 7c and 7d, or the latter only or neither one nor the other, the feeding contact of A6, by the counting sector will be maintained up to Xc, Xb only or interrupted as from Xa. From this results effectively the possibility of adjusting the control of slowing down on given distances by the track information.

On passing the beacon EC6, if the indication of the signal SN4 is still stop; this beacon transmits the information, the frequency of which passes through the channels 1, 2 and 7 of the amplifier AC. Under these conditions by means of the channel 7, CZ and RAC are fed, in order to maintain the excitation (by means of the contacts of CZ) of the relays Z and, possibly, that of T, NX1 and NX2. The channels 1 to 2 enable the respective feeding of the relays C1 and C2 only, from those of the series C. The slowing down is thus prescribed up to the running at reduced speed, obtained at the approach to EN3.

The operation of the control of the speed by means of the assembly LPM, AB, RM of FIGURE 5 has been described with the latter. It is already known that the beacons EC6, EC7, EC8 give together the same information, that it is transmitted by the amplifier AC and that, on the other hand, the instruction for an absolute stop results from the absence of any beacon transmission.

If in the example considered up to now, the indication of SN4 is still the stop of the block section, the beacon EN3 transmits the frequency admitted by the channels 1 and 7 (left hand part of the diagram, FIGURE 14). In this manner, in passing the beacon, the relays RAN and NZ fed by 7 may take up their functions, but in the series C, only C1 remains energised. In the right hand portion of the diagram the frequency possibly transmitted is among those which cannot pass the channel 7a, and from this results the opening of the contacts of C2. which causes the locking in slow running. The opening of these contacts interrupts the feeding of A2. The opening of contact 1 of the latter interrupts the connection between the line 56 and the source B, and this line controls all the elements from D and A, with the exception of A1 and A2. The feeding of RM (FIGURE 5) by the current originating from LPM may only be effected by the channel 1 of AB, which permits only a transmission of a frequency corresponding to slow running. The locking is effective, because it will only be possible to modify the present arrangement of maintenance in slow running on passing another beacon EN giving the line clear or warning information, the only arrangement which permits, by means of the channel 7a, to feed C2, whose contact 3 then re-feeds A2. The energisation of the latter enables, by means of its contact 2, the channel 2 of AB to be used and by means of its contact 1 enables the possible re-feeding of the whole device of the elements A, D, X permitting higher speeds. The section entrance beacons, EN, also constitute the "transition" beacons (passage of information by continuous feeder to information by beacons or the reverse). By means of the channel 7b of AN they control the feeding of the relay T whose contact 2 determines the method of operation of the relays C. That which has been described for stopping information applies obviously to "pre-warning" and to any decreases of speed. This description has been effected with a schematic reproduction of a section employing automatic colour light signalling. The process may be applied just as well to any method of signalling, without any slaving complication.

On the other hand different combinations of partial joining together of the amplifiers AC and AN are possible. It may be mentioned that for receiving different carriers, only the conductor circuits of these must be independent and the channels constituted by the filter circuits whose outputs are indicated on the schematic drawing may be the same, and in this case two modifications are still possible:

(1a) RAN and RAC are joined together.

(b) The frequency for the channel 7 of AN is particular to it (similar to that which exists for 7a to 7d) and it is absent from the frequency band transmitted by the beacons EC for AC, as well as from the frequency for the channel 7a of AN.

(2a) RAN and RAC are joined together.

(b) NZ and CZ are joined together, the contact 1 of CZ is eliminated.

(c) The modulated frequencies are identical for the beacons EN and EC, with the exception of the frequency for 7a, absent from the modulation of the beacons EC.

The instructions for different rates of slowing down according to the type of traffic results from the description of FIGURE 10 because on certain points where a slowing down must be observed the stipulated rate is not always the same for all the trains and there may be two classes: (1) Passenger trains or trains having the same rules for braking. (2) Goods trains the vehicles of which are not all braked, and this actually constitutes two classes for which two different sets of slowing down information must be given, for the same point.

In this case the inputs 8 of the amplifiers AZ and AZ2 are tuned to different carriers. In the case of a single rate, only a beacon EZ is placed, fed by OZ1 (FIGURE 13). It transmits a modulated carrier, received by AZ, and its operation has already been described. For the observance of two different rates of slowing down, two beacons EZ and EZ2 are placed in succession (FIGURE 13), and transmit two different carriers: The first, intended for AZ; the second for AZ2. The information for types of traffic of the first above mentioned category is that transmitted by EZ; it it received by AZ and memorised on board. On passing EZ, immediately after that of EZ, if it is a matter of a traffic of the first category, the contact CV, of the adjustable switch on the vehicle is closed. From this there results that, by means of the channel 7e of AZ2 the relay ZZ is energised and its contact connecting B2 to the line 52 of all the relays Z. The information previously recorded by AZ is not modified (it is already known that the channels 7 of AZ and AZ2 feed ZC which maintains the relays C). If, on the contrary, it is a matter of a traffic of the second category the contact CV is open and ZZ cannot be energised. Under these conditions, the information received by AZ2, which is more restrictive than the preceding one, annuls the latter, and in turn, is memorised for the control of the rate which is specific to this traffic. At the end of slowing down, a single beacon EZR, fed by OZ2, controls the re-feeding of all the relays Z.

As for AC and AN of FIGURE 9, the selector channels of AZ and AZ2 may be common, subject only to the reservation that the frequency passing the channel 7e be then different from that provided for the channel 7. On the other hand, AZ and AZ2, joined together or not, may comprise the channels 7b, 7c, 7d, like AN. In this case, the contact 1 of ZC is eliminated.

FIGURE 11 indicates supplementary levels of speed control, the number of which does not depend on those which are prescribed by the track. In the example given a supplementary level for each counting sector is shown. It is obvious that this arrangement is in no way limiting. The relays of the series C and Z are partly shown and from 1 to 4 only, a sufficient number for the description. The line 59 is connected to the contact 1 of A5b, not shown, but the connections of which are exactly identical to those of A4b which can be seen in the figure. The line 60 is extended towards the other points A, X, D to be connected to the point 56 (contact 1 of A2). The line 61 connects to AB9 the corresponding contacts of the relays of the series A not shown on the figure.

The operation is as follows: Consider a slowing down already effected up to C4–Z4 and carried to a new restrictive rate C2–Z2, by abolishing the contacts Z for example. From the opening of the contacts of Z4 there results the immediate suppression of the feeding of D4 (the line 59 being already interrupted by the prior opening of the contacts of A5b). When the studs of the sector of D4 pass in the position which no longer permits the contact Xm (operation described with reference to FIGURE 5) A4 is no longer fed and its contact 3 opens and interrupts the connection of the channel 4 of of AB. However, by means of the contact Xn, down the line from Xm, the relay A4b is still energised and maintains the connection of the channel 4b of AB, intermediate between the channels 3 and 4 which constitutes a supplementary level, relatively to the level 4, controlled by the track. On passing the studs in the position which does not ensure the contact in front of Xn, A4b is no longer fed, it interrupts the connection of the channel 4b of AB and the feeding of D3. The studs controlled by the latter then start to pass in the position which does not ensure the contact and the same process is renewed for Xd–A3 and Xe–A3b. Only A2 and A1 remain fed respectively by C2–Z2 and C1–Z1.

FIGURE 12 shows a counting device having magnetic tracks corresponding to the already known sectors. Only the relays 5 and 6 of the series A, C, Z are shown, the connections of the others being identical. In the line clear position, the relay A6 is fed by the source B by means of the contacts 1 of A2 (FIGURE 9), of the line 56, of the contacts 3 of the relays C6 and Z6 and of the connecting element EL6. This connecting element connects the reading head LR6 to the relay A6 by means of a conventional amplifier and rectifying element, it also directly connects the contact 3 of C6 to A6. On the other hand, an alternating current generator GPM, not shown, but whose input line is shown on FIGURE 9 feeds, by means of the contact 3 of A2 (same figure) and the line 57 which ends at the contacts 2 of C6–Z6 the recording heads DM6 and DM6R which magnetise the track PM6. If the direction of rotation AV is considered, it is the recording originating from the head DM6 which influences the reading head LR6. In the reverse direction, it is DM6R. The current generated in the reading head LR6 by the passing of the track PM6, when it has been magnetised by a recording head, acts on A6 by means of the connecting element EL6. An erasing head EF, situated between the recording heads of each direction ensures the passing of a non-magnetised track, at the start of the passing under the recording heads. A permanent magnet safety device is mounted in series on the line 18 (line 18a of FIGURE 12). It is releasetd when the magnetisation of the erasing head becomes weaker The arrangement is exactly the same for the level 5 (as well as for the others, which are not shown). In the case of use of magnetic tracks, the connection 56–62 of FIGURE 9 is modified since it is no longer a matter of sectors having studs. The elements PM5, DM5, DM5R, LR5, EL5 and A5 are exactly similar to PM6, DM6, DM6R, LR6, EL6 and A6.

For the actuation of the control of slowing down, it is seen that immediately on the opening of the contacts of C6 or Z6, on the one hand the relay A6 is no longer fed by the source B, on the other hand the connection of the generator GMP to the recording heads DM6, DM6R is interrupted. As a consequence, when the portion of track which is magnetised by a recording head before its interruption of feeding will have passed entirely under the reading head LR6, it is a non magnetised portion which will pass under it. A6 being no longer energised its contacts will open and this will have the already known consequences, except for the fact that the contact 1 of A6, instead of interrupting the connection of an electromagnet D with the source B, will interrupt the feeding of the recording heads DM5 and DM5R which will cause the deenergization of A5, delayed in distance as that of A6 and also in a similar manner to that released by counting sectors having studs. The re-energisation of the relays A and of the recording heads is similar to that of the sectors having studs, as is shown by the connections of FIGURE 12. In the case of the employment of magnetic tracks for the counting of distance, the line 56–62 of FIGURE 9 is, as has been stated, modified since the contacts of NX1 and NX2 act on the feed circuit of the recording heads; an arrangement of this type is substituted for the sector of D6 indicated on this figure.

The interrupter CV6, of the adjustable switching on the vehicle enables the permitted speed to be limited to that corresponding to the channel 5 of AB (the connection of 6 being interrupted). It is obvious that other circuits of AB may be controlled in the same manner for more important limitations.

The use of magnetic tracks, such as defined above, also lends itself to methods of adjustment and to modifications applied to sectors having studs.

FIGURE 13 which shows an example of positioning of beacons has already been described. It may be noted that the modifications of positioning and of feeding of the beacons are too numerous to justify description. It will only be indicated that the beacons EC and EN may give the indication: "line clear" up to a certain speed and, this being so, ensure that the limitation of speed on certain sections will be abided by without supplementary positioning. On the other hand, the control of slowing down after passing the "pre-warning" indication need only be released at the passing of the beacon EC2, if the pre-warning indication is supplied by SN2.

In FIGURE 14, already referred to, the frequencies have increasing values from left to right. In the left hand zone, it is seen that the channels 1 and 6 admit, in this order, only frequencies which are lower and lower. As a consequence, as the transmitted frequency increases the outputs of the channels 6 to 2, in this order, cease to be fed and only the channels 1, 7 and 7e are fed whatever the frequency transmitted in this range.

The right hand zone shows the selection which may be effected for the channels 7a to 7d. The feeding combinations are the following, in their increasing order of frequency: 7a–7a, 7d–7a, 7d, 7c–7a, 7b, 7d, 7c–7a, 7b, 7d–7a, 7b–7b. They correspond to the operational characteristics which have been described. Several combinations may, of course, be effected in accordance with this general process.

ON FIGURE 15 one of the contacts having an accelerated action is shown. The general operation concerning the movable contact lever L, whose soft iron end FD is under the influence of one or the other of the poles (APN, APS) of the permanent magnet AP and possibly under that of electro-magnets of the series D has already been described in FIGURES 6, 7 and 8. In the example of FIGURE 15, the studs are no longer directly fixed on the lever L. The latter carries, at one of its ends, a soft iron part portion AL. All the levers L are driven with a circular motion, by the part DT which supports them, itself driven in rotation by the part AS with which it is integral and which pivots about an axis y. In the course of this circular movement, the part AL of the lever L passes in the vicinity of the magnet AX of the lever 12 which is fixed relatively to the plane of rotation of the lever L, but may oscillate about an axis LX. The lever 12 carries an insulating part MX which supports a stud X which may come into contact with another stud X, the latter being fixed, in order to enable a possible connection, designated under this same letter of general reference in the various schematic arrangements.

When the movement of rotation of the lever L causes the part AL to come above the magnet AX of the lever L2, if the lever is in the position "interruption of X" (that of FIGURE 15) the air gap AL–AX is large, no magnetic action exists and the studs X remain spaced apart. If the position of the lever L is "contact of X," the part FD is under the influence of the pole APN of the magnet AP which maintains it in a position such that the air gap AL–AX is then very small; as a consequence the magnet AX, integral with the lever L2 which may oscillate, tends to become applied against AL, which causes the contact of the two studs X, with a suitable pressure. By means of the previous description, relating to the embodiment comprising studs which are directly mounted on the levers L, it is known that these studs constitute a circular surface which only comprises a very small gap between studs, which is negligible in relation to the fixed frictional elements which contact them. This is the same for the parts AL of the levers L and the magnets AX of the levers L2.

The arrangement which has just been described enables a clear and rapid contact and interruption to be obtained.

The controls on the vehicle for the switching of the speed limiters and for changing the levels of the slowing down curves according to the type of traffic, which are predetermined by the route and the direction of running may comprise a series of contacts controlling the feedings of an electro valve which, in case of non agreement, cannot be energised and therefore controls the application of the brakes.

The invention is not limited to the specific embodiments which have been given; the different parts may be combined in various ways and modifications may be made which do not go beyond the scope of the invention.

One may in particular mention:

(1) The pick-ups R and R1, shown separately, may constitute one single unit only, the selection for feeding the amplifiers being effected by the tuning of the input circuits of the latter.

(2) The number of relays of the series C and Z as well as the number of the series may be chosen at will.

(3) The relays shown as electromagnetic may be, for example, electronic, ionic, semi-conductors or of another suitable form.

(4) These relays may be split into two with respect to the functions which they have to fulfil or on the contrary may be joined together in order to reduce their number, if this is necessary.

The amplifier or rectifier elements may be tubes, transistors or any suitable elements. The device giving information on the controlled speed and actuated by the process of transmission, memorising and connection may be different from those which has been described and be of any nature.

One may also mention that the beacons situated in this description on a single axis which is longitudinal to the track for a given direction of traffic, may be situated on a common axis, in the centre or on the contrary may be distributed on several axes for a given direction of traffic. This latter solution requires that the generator on a vehicle be split into two, but simplifies the slavings.

Although in the invention which has been described, the track installations constitute the origin of the information and the pilot element which governs all the running, the principle of generators having variable modulated frequencies, either simultaneous or cut into pulses, is known per se and the present invention only characterises its novel application. This is the same for the switchings slaved to signals whatever the modifications and combinations of these may be.

This being so, in the schematic view of the equipment on a vehicle the connections enabling the repetition and the recording of the signals have not been shown. It is obvious that this arrangement is easy to achieve with slaving circuits and the contacts which may be available. It is then only a matter of a known application of known means.

It is obvious that the use of types of current which differ from those envisaged in the example described does not go beyond the scope of the invention. It is in particular possible to use a greater or smaller number of carrier frequencies, and also it is possible to make a larger use of transmission by pulses for instance in such a manner that the different informations may be transmitted by means of a single channel connected to the beacons by means of a frequency selector.

The filter-circuits of the various amplifiers may be constituted by vibrating blades.

I claim:

1. In a safety automatic train control system comprising both beacons and feeder means for transmitting information from the track to the train in the form of modulations imposed upon carrier frequencies, the improvement which comprises means for automatically adapting the vehicle equipment to the correct reception of said information regardless of whether it is transmitted by said feeder means or by successive beacons, said adapting means comprising means in the track installations for causing an additional modulation of at least one of said carrier frequencies, two beacons at the transition points of the track where the vehicle passes from a section with information by feeder to a section with information by beacons, one of said two beacons being located on the side of the track section corresponding to beacon information and transmitting the said at least one carrier frequency with said additional modulation, while the other of said two beacons is located on the side of the track section corresponding to continuous feeder information and transmits the same carrier frequency without said additional modulation, a receiving amplifier on the vehicle for one carrier frequency, a filter circuit for passing said additional modulation through said amplifier, means for storing information received through said receiving amplifier and relay means connected to said filter-circuit and fed by the current resulting from said additional modulation to act on said storing means, said relay means connecting said storing means to said amplifier when energized when said amplifier is receiving beacon information, and cutting off said storing means when not energized because said amplifier is receiving feeder information.

2. In a safety automatic train control system, a device on said train for counting the distance travelled from the point where a track information is received, said device comprising an electro-magnet the energization of which is controlled by the track information, rotatably mounted means driven in rotation by the running gear of the train and carrying a plurality of studs comprising a magnetic material and mounted to pass successively into the field of said electromagnet, each of said studs being movable between two possible positions in a plane perpendicular to their rotation plane in response to energization and de-energization of said electromagnet when a stud passes through the field thereof, an arcuate permanent magnet having poles by which said studs pass after passing said electromagnet, said poles acting to retain said studs in whichever of said two positions they occupied when in front of the electromagnet, fixed contacts carried by the train and located adjacent the path of travel of said studs in a position to be closed by said studs as they pass by, when said studs are in one of their two positions, said contacts being positioned to be passed by any of the studs only after a rotation of the latter from a position in front of said electromagnet, the extent of said rotation corresponding to the distance travelled by the vehicle from the point at which the track information is given to the one at which an action affecting the train is required to be effective, an electromagnet and a permanent magnet being located on both sides of said fixed contacts to allow control of the train when running in either direction.

3. A safety automatic train control system the vehicle equipment of which comprises speed control means and further means connected to said speed control means for providing a signal thereto and for cancelling said signal when the vehicle has travelled a predetermined distance from a point at which instructions are received, said speed control means being effective only when said signal is cancelled, further means comprising an endless magnetic track driven in rotation by the running gear of the train, magnetizing means positioned to magnetize said magnetic track, a generator connected to supply said magnetizing means, means responsive to the receipt of said instructions for controlling the connection of said generator to said magnetizing means, a reading head positioned adjacent the path of travel of said magnetic track for energization to generate a current when a magnetized portion of said magnetic track passes thereby, said reading head being connected to said speed control means and providing said signal thereto, whereby the interruption of the supply to said magnetizing means results in cancellation of said signal once the magnetized portion of said magnetic track lying between said magnetizing means and reading heat at the time the current supply to said magnetizing means is interrupted has passed beyond said magnetizing means, the distance between said magnetizing means and reading head, and consequently the length of said magnetized portion, being proportional to the distance the train is to travel between the time of reception of the information and the time an action by the speed control means is required to take place.

4. In a safety automatic train control system comprising an electrical circuit and means supplied through said electrical circuit for providing an automatically stopping of said train upon interruption of the flow of current in said circuit, the improvement which comprises at least three circuit-completing means connected in parallel, the closure of any one of which completes said electrical circuit, first supply means which generates a current while the train is moving at a speed exceeding a predetermined level, means supplied by said first supply means for closing one of said circuit completing means, alternative means for supplying electrical current when said train is moving at a speed which does not substantially exceed said level, commutator means driven by movement of the train and positioned to connect said alternative supply means to supply at any time at least one of the other two circuit completing means, said other two circuit completing means being adapted to close too slowly to complete their closing action while their supply is being interrupted by movement of said commutation means due to movement of said train at a speed which does not substantially exceed said level, so that said electrical circuit can be closed through one of said other two circuit closing means only when said train is moving at a speed which does not substantially exceed said level, and means actuated when the first supply means generate no current for connecting said alternative supply means to said commutator means.

5. A safety automatic train control system the vehicle equipment of which includes speed control means and further means connected to said speed control means for providing a signal thereto and for cancelling said signal when the vehicle has covered a predetermined distance from a point at which instructions are received, said speed control means being effective only when said signal is cancelled, said further means comprising an endless magnetic track driven in rotation by the running gear of the train, magnetizing means positioned to magnetize said magnetic track, a generator connected to supply said magnetizing means, means responsive to the receipt of said instructions for controlling the connection of said generator to said magnetizing means, a plurality of reading heads positioned adjacent the path of travel of said magnetic track for energization to generate a current when a magnetized portion of said magnetic track passes thereby, said reading heads being connected to said speed control means and providing said signal thereto, whereby the interruption of the supply to said magnetizing means results in the cancellation of said signal once the magnetized portion of said magnetic track lying between said magnetizing means and reading heads at the time the current supply to said magnetizing means is interrupted, has passed beyond said magnetizing means, the respective distances between said magnetizing means and the respective reading heads and, consequently, the length of said magnetized portion being proportional to the distance the train is to cover between the time of reception of the information and the time an action by the speed control means is required to take place and means, controlled by the track information, for selecting a predetermined one of said reading heads.

6. A train control system comprising means for providing an automatic emergency stopping of the train as a function of signal indications on the track, said signal indications corresponding to a plurality of classes and types of instructions, and control means having an output connected to said stopping means, said control means normally providing an electric signal at said output and said stopping means being effective to stop the train each time said electric signal is not present, said control means comprising a train-carried oscillator adapted for generating a modulated carrier wave and track oscillator means adapted for generating a plurality of carrier waves having predetermined frequencies which are respectively assigned to the transmission of the various classes of instructions and for modulating each of said waves in accordance with the type of the instruction in the corresponding class, and train-carried further means comprising receiving means coupled to said train carried oscillator and to said track oscillator means and adapted for selecting the respective modulated carrier waves, said further means further comprising respective pluralities of relay units connected to said receiving means and corresponding to the respective classes of instructions, the respective relay units in each plurality corresponding to the respective types of instructions, said relay units each having "on" and "off" conditions and being normally in the "off" condition and switched to the "on" condition each time a current is applied thereto, contact means coupled to said relay units and controlled thereby for providing said electric signal when said relay units are in the "on" condition, said contact means forming a plurality of memory units, the respective memory units of said plurality being controlled by the respective relay units, the memory units pertaining to a given type of instructions being serially connected, means coupled to said relay units and adapted for temporarily switching said relay units in the "on" condition under the control of the modulated carrier-waves generated by said track oscillator means and means coupled to said relay units and controlled by the modulated carrier wave generated by said train-carrier oscillator for sustaining in the "on" condition the switched-on relay units.

7. A train control system comprising means for providing an automatic emergency stopping of the train as a function of signal indications on the track, said signal indications corresponding to a plurality of classes and types of instructions and control means having an output connected to said stopping means, said control means normally providing an electric signal at said output and said stopping means being effective to stop the train each time said electric signal is not present, said control means comprising a train-carried oscillator adapted for generating a modulated carrier wave and track oscillator means adapted for generating a plurality of carrier waves having predetermined frequencies which are respectively assigned to the transmission of the various classes of instructions and for modulating each of said waves in accordance with the type of the instruction in the corresponding class, and train-carried further means having an output and comprising receiving means coupled to said train carried oscillator and to said track oscillator means and adapted for selecting the respective modulated carrier waves, said further means further comprising respective pluralities of relay units connected to said receiving means and corresponding to the respective classes of instructions, the relay units in each plurality corresponding to the respective types of instructions, said relay units each having an "on" and "off" condition and being normally in the "off" condition and switched to the "on" condition each time a current is applied thereto, contact means coupled to said relay units and controlled thereby for providing said electric signal when said relay units are in the "on" condition, said contact means forming a plurality of memory units, the respective memory units of said plurality being controlled by the respective relay units, the memory units pertaining to a given type of instruction being serially connected, means coupled to said relay units and adapted for temporarily switching said relay units in the "on" condition under the control of the modulated carrier-waves generated by said track oscillator means, means, coupled to said relay units and controlled by the modulated carrier wave generated by said train-carried oscillator for sustaining in the "on" condition the switched-on relay units, speed indicator means for generating a current having a frequency which is a predetermined function of the train speed, a plurality of filter systems having respective predetermined pass-bands and means, connected to said memory units and including distance counting means, for counting the distance travelled by the train after transmission of an instruction and for establishing the connection of said speed indicator means to the output of said further means through a predetermined one of said filter systems when a predetermined distance has been travelled.

8. A train control system comprising means for providing an automatic emergency stopping of the train as a function of signal indications on the track, said signal indications corresponding to a plurality of classes and types of instructions, and control means having an output connected to said stopping means, said control means normally providing an electric signal at said output and said stopping means being effective to stop the train each time said electric signal is not present, said control means comprising a train-carried oscillator adapted for generating a modulated carrier wave and track oscillator means adapted for generating a plurality of carrier waves having predetermined frequencies which are respectively assigned to the transmission of the various classes of instructions and for modulating each of said waves in accordance with the type of the instruction in the corresponding class, and train-carried further means, having an output and comprising receiving means coupled to said train carried oscillator and to said track oscillator means and adapted for selecting the respective modulated carrier waves, said further means further comprising respective pluralities of relay units connected to said receiving means and corresponding to the respective classes of instructions, the respective relay units in each plurality corresponding to the respective types of instructions, said relay units each having "on" and "off" conditions and being normally in the "off" conditions and switched to the "on" condition each time a current is applied thereto, contact means coupled to said relay units and controlled thereby for providing said electric signal when said relay units are in the "on" condition, said contact means forming a plurality of memory units, the respective memory units of said plurality being controlled by the respective relay units, the memory units pertaining to a given type of instructions being serially connected, means coupled to said relay units and adapted for temporarily switching said relay units in the "on" condition under the control of the modulated carrier-waves generated by said track oscillator means, means coupled to said relay units and controlled by the modulated carrier wave generated by said train-carried oscillator, for sustaining in the "on" condition the switched-on relay units, speed indicator means for generating a current having a frequency which is predetermined function of the train speed, a plurality of filter systems having respective predetermined pass-bands and means, connected to said memory units and including distance counting means for counting the distance travelled by the train after transmission of an instruction and for establishing the connection of said speed indicator means to the output of said further means through a predetermined one of said filter systems when a predetermined distance has been travelled, said speed indicator means comprising an endless magnetic recording medium having an alternating current recorded thereon, means for driving said medium at a speed which is a function of the train speed and a reading head co-operating with the driven medium.

9. A train control system comprising means for providing an automatic emergency stopping of the train as a function of signal indications on the track, said signal indications corresponding to a plurality of classes and types of instructions and control means having an output connected to said stopping means, said control means normally providing an electric signal at said output and said stopping means being effective to stop the train each time said electric signal is not present, said control means comprising a train-carried oscillator adapted for generating a modulated carrier wave and track oscillator means adapted for generating a plurality of carrier waves having predetermined frequencies which are respectively assigned to the transmission of the various classes of instructions and for modulating each of said waves in accordance with the type of the instruction in the corresponding class, and train-carried further means, comprising receiving means coupled to said train-carried oscillator and to said track oscillator means and adapted for selecting the respective modulated carrier waves, said further means further comprising respective pluralities of relay units connected to said receiving means, and corresponding to the respective classes of instructions, the respective relay units in each plurality corresponding to the respective types of instructions, said relay units each having "on" and "off" conditions and being normally in the "off" condition and switched to the "on" condition each time a current is applied thereto, contact means coupled to said relay units and controlled thereby for providing said electric signal when said relay units are in the "on" condition, said contact means forming a plurality of memory units, the respective memory units of said plurality being controlled by the respective relay units, the memory units pertaining to a given type of instruction being serially connected, means, coupled to said relay units and adapted for temporarily switching said relay units in the "on" condition under the control of the modulated carrier waves generated by said track oscillator means, means coupled to said relay units and controlled by the modulated carrier wave generated by said train-carried oscillator, for sustaining in the "on" condition the switched-on relay units, said further means further including a plurality of auxiliary means coupled to said relay units and adapted for sustaining the switched-on relays, each of the respective auxiliary means of said plurality being assigned to a predetermined class of instructions and being controlled by any of those of the modulated carrier waves generated by said track oscillator means which are assigned to the classes of instructions other than said predetermined class.

10. A train control system comprising means for providing an automatic emergency stopping of the train as a function of signal indications on the track, said signal indications corresponding to a plurality of classes and types of instructions and control means having an output connected to said stopping means, said control means normally providing an electric signal at said output and said stopping means being effective to stop the train each time said electric signal is not present, said control means comprising a train-carried oscillator adapted for generating a modulated carrier wave and track oscillator means adapted for generating a plurality of carrier waves having predetermined frequencies which are respectively assigned to the transmisson of the various classes of instructions and for modulating each of said waves in accordance with the type of the instruction in the corresponding class, and train-carried further means having an output and comprising receiving means coupled to said train carried oscillator and to said track oscillator means and adapted for selecting the respective modulated carrier waves, said further means further comprising respective pluralities of relay units connected to said receiving means and corresponding to the respective classes of instructions, the respective relay units in each plurality corresponding to the respective types of instructions, said relay units each having "on" and "off" conditions and being normally in the "off" condition and switched to the "on" condition each time a current is applied thereto, contact means coupled to said relay units and controlled thereby for providing said electric signal when said relay units are in the "on" condition, said contact means forming a plurality of memory units, the respective memory units of said plurality being controlled by the respective relay units, the memory units pertaining to a given type of instruction being serially connected, means coupled to said relay units and adapted for temporarily switching said relay units in the "on" condition under the control of the modulated carrier waves generated by said track oscillator means, means, coupled to said relay units and controlled by the modulated carrier wave generated by said train-carried oscillator, for sustaining in the "on" condition the switched-on relay units, speed indicator means for generating a current having a frequency which is a predetermined function of the train speed, a plurality of filter systems having respective predetermined pass-bands and means, connected to said memory units and including distance counting means for counting the distance covered by the train after transmission of an instruction and for establishing the connection of said speed indicator means to the output of said further means through a predetermined one of said filter systems when a predetermined distance has been travelled, said distance counting means including at least one endless magnetic recording medium having an alternating current of a predetermined frequency recorded thereon, means for driving said medium at a speed which is a function of the distance covered by the train and at least one reading head co-operating with said driven medium.

11. A train control system comprising means for providing an automatic emergency stopping of the train as a function of signal indications on the track, said signal indications corresponding to a plurality of classes and types of instructions and control means having an output connected to said stopping means, said control means normally providing an electric signal at said output and said stopping means being effective to stop the train each time said electric signal is not present, said control means comprising a train-carried oscillator adapted for generating a modulated carrier wave and track oscillator means adapted for generating a plurality of carrier waves having predetermined frequencies which are respectively assigned to the transmission of the various classes of instructions and for modulating each of said waves in accordance with the type of the instruction in the corresponding class, and train-carried further means having an output and comprising receiving means coupled to said train carried oscillator and to said track oscillator means and adapted for selecting the respective modulated carrier waves, said further means further comprising respective pluralities of relay units connected to said receiving means and corresponding to the respective classes of instructions, the respective relay units in each plurality corresponding to the respective types of instructions said relay units each having "on" and "off" conditions and being normally in the "off" condition and switched to the "on" condition each time a current is applied thereto, contact means coupled to said relay units and controlled thereby for providing said electric signal when said relay units are in the "on" condition, said contact means forming a plurality of memory units, the respective memory units of said plurality being controlled by the respective relay units, the memory units pertaining to a given type of instruction being serially connected, means, coupled to said relay units and adapted for temporarily switching said relay units in the "on" condition under the control of the modulated carrier-waves generated by said track oscillator means, means coupled to said relay units and controlled by the modulated carrier wave generated by said train-carried oscillator, for sustaining in the "on" condition the switched-on relay units, speed indicator means for generating a current having a frequency which is a predetermined function of the train speed, a plurality of filter systems having respective predetermined pass-bands and means, connected to said memory units and including distance counting means, for counting the distance covered by the train after transmission of an instruction and for establishing the connection of said speed indicator means to the output of said further means through a predetermined one of said filter systems when a predetermined distance has been covered., said distance counting means including at least one endless magnetic recording medium having an alternating current of a predetermined frequency recorded thereon, means for driving said medium at a speed which is a function of the distance covered by the train, at least one reading head co-operating with said driven medium, at least one erasing head co-operating with the driven medium and auxiliary means connected to said output of said control means for cancelling said electric signal in case of failure of said erasing head.

12. A train control system comprising means for providing an automatic emergency stopping of the train as a function of signal indications on the track, said signal indications corresponding to a plurality of classes and types of instructions and control means having an output connected to said stopping means, said control means normally providing an electric signal at said output and said stopping means being effective to stop the train each time said electric signal is not present, said control means comprising a train-carried oscillator adapted to oscillate at a predetermined frequency and to modulate said frequency, whereby a modulated carrier wave is generated, said oscillator having a tuned circuit including at least one component located in the lower part of the train at a small distance from the railway track and a screen element on the track, said component being adapted to co-operate with said screen element when passing in the proximity thereto for stopping the oscillation of said oscillator at said frequency, said oscillator having an output, means coupled to said oscillator output, said means being adapted to provide said electric signal when said oscillation is not stopped, track oscillator means, train-carried further means for providing said electric signal, means for coupling said track oscillator means to said further means, and means controlling said coupling means as a function of the signal indications, said track oscillator means being adapted for generating a plurality of carrier waves having predetermined frequencies which are respectively assigned to the transmission of the various classes of instructions and for modulating each of said waves in accordance with the type of the instruction in the corresponding class, said further means having an output and comprising receiving means coupled to said train carried oscillator and to said track oscillator means and adapted for selecting the respective modulated carrier waves, said further means further comprising respective pluralities of relay units connected to said receiving means and corresponding to the respective classes of instructions, the respective relay units in each plurality corresponding to the respective types of instructions, said relay units each having "on" and "off" conditions and being normally in the "off" condition and switched to the "on" condition each time a current is applied thereto, contact means, coupled to said relay units and controlled thereby for providing said electric signal when said relay units are in the "on" condition, said contact means forming a plurality of memory units, the respective memory units of said plurality being controlled by the respective relay units, the memory units pertaining to a given type of instructions being serially connected, means coupled to said relay units and adapted for temporarily switching said relay units in the "on" condition under the control of the modulated carrier-waves generated by said track oscillator means, means coupled to said relay units and controlled by the modulated carrier wave generated by said train-carried oscillator, for sustaining in the "on" condition the switched-on relay units, speed indicator means for generating a current having a frequency which is a predetermined function of the train speed, a plurality of filter systems having respective predetermined pass-bands and means, connected to said memory units and including distance counting means, for counting the distance covered by the train after transmission of an instruction and for establishing the connection of said speed indicator means to the output of said further means through a predetermined one of said filter systems when a predetermined distance has been covered, the current being provided by the speed indicator means and transmitted to said output only when the train is on the move, and auxiliary means, controlled by said track oscillator means for providing a signal on said output of the control means when the oscillation of said train-carried oscillator is stopped.

13. In a train control system comprising a plurality of signal providing means along each section of the track, means for providing an automatic emergency stopping of the train as a function of the signal indications provided along the track, control means having an output connected to said stopping means, said control means normally providing an electric signal at said output and said stopping means being effective to stop the train each time said electric signal is not present, said control means comprising a train-carried oscillator adapted for providing a modulated carrier wave, and track oscillator means cooperating with said signal providing means for generating a plurality of modulations having predetermined frequencies which are respectively assigned to the transmission of the various signal indications, and train-carried further means coupled to said train-carried oscillator and to said track oscillator means, said further means having an output and comprising receiving means coupled to said train-carried oscillator and to said track oscillator means and adapted for selecting the respective modulated carrier waves, said further means further comprising a plurality of relay units connected to said receiving means and each having an "on" and "off" condition and means, controlled by said relay units, for providing said electric signal when said relay units are in the "on" condition, speed indicator means for generating a current having a frequency which is a predetermined function of the train speed, a plurality of filter systems having respective predetermined pass-bands and means for establishing the connection of said speed indicator means to the output of said further means through a predetermined one of said filter systems, said track oscillator means including first auxiliary means located at one end of a track section and providing a first predetermined modulation except when the train has overrun a signal indicating that said track section is occupied, and second auxiliary means located at the other end of the said section, providing a second predetermined modulation when the train has overrun a signal indicating that the following track section is not occupied, said plurality of relay units including an auxiliary relay unit coupled to said first auxiliary means and controlled thereby, said auxiliary relay unit being switched to its "off" condition each time said first predetermined modulation is not present, said auxiliary relay unit being further coupled to said second auxiliary means and controlled thereby, said auxiliary relay unit being switched to its "on" condition each time said second predetermined modulation is present, irrespective of any other modulation pertaining to said plurality of modulations, said filter systems including an auxiliary predetermined filter system having a pass-band which corresponds to a predetermined authorized slow speed, said auxiliary relay unit being coupled to and controlling said means for establishing the connection of said speed indicator means to the output of said further means through said auxiliary predetermined filter system.

References Cited by the Examiner

UNITED STATES PATENTS

| | | | |
|---|---|---|---|
| 1,554,113 | 9/25 | Merrill. | |
| 1,786,818 | 12/30 | Baughman | 246—63 X |
| 1,800,972 | 4/31 | Williams et al. | 246—30 |
| 1,816,628 | 7/31 | Williams et al. | 246—30 |
| 1,824,144 | 9/34 | Howe | 246—182 |
| 2,098,401 | 11/37 | Prescott | 246—182 X |
| 2,182,637 | 12/39 | Marbury | 246—161 |
| 2,249,015 | 7/41 | Logan | 246—182 |
| 2,255,192 | 9/41 | Smith | 246—182 |
| 2,279,849 | 4/42 | Warrington | 246—161 |
| 2,554,056 | 5/51 | Peter | 246—63 |
| 2,557,954 | 6/51 | Durheim et al. | |
| 2,606,281 | 8/52 | Thomas et al. | 246—29 |
| 2,632,844 | 3/53 | Hughson | 246—63 |
| 2,636,113 | 4/53 | Deloraine | 246—63 |
| 2,643,369 | 6/53 | Manley et al. | 246—187 |
| 2,656,002 | 10/53 | Keeton | 246—182 |
| 2,719,911 | 10/55 | Maenpaa | 246—182 |
| 2,761,961 | 9/56 | Hughson | 246—63 |
| 2,817,012 | 12/57 | Kendall | 246—63 |
| 2,838,657 | 6/58 | Wilcox | 246—182 |
| 2,905,810 | 9/59 | Ferm | 246—63 |
| 2,915,623 | 12/59 | Hughson | 246—63 |
| 2,946,899 | 7/60 | Day | 246—63 X |
| 2,992,324 | 7/61 | Rolle | 246—63 |
| 3,041,449 | 6/62 | Bingen | 246—182 |
| 3,089,029 | 5/63 | Brinker | 246—182 |

EUGENE G. BOTZ, *Primary Examiner.*

JAMES S. SHANK, LEO QUACKENBUSH, *Examiners.*